(12) United States Patent
Hospodor

(10) Patent No.: US 6,470,420 B1
(45) Date of Patent: Oct. 22, 2002

(54) METHOD FOR DESIGNATING ONE OF A PLURALITY OF ADDRESSABLE STORAGE DEVICES TO PROCESS A DATA TRANSFER REQUEST

(75) Inventor: Andrew D. Hospodor, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/542,954

(22) Filed: Mar. 31, 2000

(51) Int. Cl.[7] .............................................. G06F 12/00
(52) U.S. Cl. ........................ 711/114; 711/162; 711/167; 709/214
(58) Field of Search ................................ 711/112, 114, 711/167, 168, 162, 163; 709/214; 360/47, 59

(56) References Cited

U.S. PATENT DOCUMENTS

| | | | |
|---|---|---|---|
| 5,390,313 A | * 2/1995 | Yanai et al. .................. 360/47 |
| 5,463,578 A | * 10/1995 | Gambino et al. .............. 360/59 |
| 5,819,310 A | * 10/1998 | Vishlitzky et al. ........... 711/114 |
| 5,832,522 A | 11/1998 | Blickenstaff et al. ........ 707/204 |
| 5,892,914 A | 4/1999 | Pitts ............................ 710/56 |

* cited by examiner

Primary Examiner—Kevin L. Ellis
Assistant Examiner—B. Peugh
(74) Attorney, Agent, or Firm—Milad G. Shara, Esq.

(57) ABSTRACT

A plurality of addressable storage devices ("ASD's") store a replicated data set. A requestor multicasts a data transfer request to the ASD's. The ASD's receive the data transfer request and cooperatively designate one of the ASD's to process the data transfer request and prevent the other ASD's from processing the data transfer request. The designated ASD satisfies the data transfer request and then communicates to the requestor an acknowledgement when the processing is completed. The ASD's maintain coherency in the replicated data set.

19 Claims, 11 Drawing Sheets

METHOD FOR DESIGNATING ONE OF A PLURALITY OF ADDRESSABLE STORAGE DEVICES TO PROCESS A DATA TRANSFER REQUEST

BACKGROUND OF THE INVENTION

1. Field of the Invention

This invention relates to the operation of a network of addressable storage devices which are configured to access a replicated data set. More particularly, this invention relates to reducing the response time of the storage devices to a request to read or write data, while more efficiently utilizing the storage device resources and assuring that coherency is maintained between data set replicated on each of the storage devices.

2. Description of the Prior Art and Related Information

Previous data storage systems have made use of multiple addressable storage devices, hereinafter referred to as "ASD's." Such ASD's can be hard disk drives, cache memory devices, or other storage elements which permit data to be accessed by referencing an address pointing to a specific data component such as a block of predetermined length. In many such systems, the data stored is replicated or mirrored on a plurality of ASD's. U.S. Pat. No. 5,390,313 to Yanai et al., U.S. Pat. No. 5,463,758 to Ottesen and U.S. Pat. No. 5,819,310 to Vishlitzky et al. describe storage systems utilizing multiple storage devices having mirrored data. These references also describe methods for using the multiple storage devices to reduce the data access time. However, the prior art has been limited in teaching methods of achieving higher performance which scales with the number of storage devices deployed.

In the communications field, it is known to connect intelligent addressable devices, such as computers, to form networks such as switched fabric networks. Switched fabric networks can be configured for example, as hypercubes. The addressable devices serve as the "nodes" of the hypercube. A single node can be considered as a zero dimensional cube, two nodes joined by a line (or "edge") are a one dimensional cube, four nodes arranged in a square are a two dimensional cube and eight nodes are an ordinary three dimensional cube. Continuing this geometric progression, the first hypercube has 16 nodes and is a four dimensional shape (a "four-cube") and an N dimensional cube has $2^N$ nodes (an "N-cube").

Switched fabric networks utilize packet switching, a communications paradigm, in which packets (messages or fragments of messages) are individually routed between nodes, with no permanently established communication path. Packets are routed to their destination through the most expedient route (as determined by some routing algorithm). Not all packets travelling between the same two hosts, even those from a single message, will necessarily follow the same route. The destination node reassembles the packets into their appropriate sequence.

In switched fabric networks, commands can be "broadcast" to all members, rather than specific members of a group, or can be "multicast" between a single sender and a multiple specific group of receiving addresses on the network. Packet switching is used to optimize the use of the bandwidth available in a network and to minimize the latency. Although the switched fabric architecture provides an efficient medium for transmitting data, the latency inherent in accessing data from ASD's connected in a fabric may prevent achieving full advantage of the switched fabric medium. There remains a need for an effective way to manage ASD's in a switched fabric environment to provide performance which scales with the number of devices.

SUMMARY OF THE INVENTION

This invention can be regarded as a method for operating a plurality of addressable storage devices (ASD's) that store a replicated data set. The method comprises receiving a multicasted request for the ASD's to supply a subset of the replicated data set which is stored in both a first and second one of the ASD's. The first ASD multicasts a control signal so that the second ASD receives the control signal and refrains from supplying the subset. The first ASD then supplies the subset.

In one aspect of the invention, first and second ASD's have respective first and second response times for supplying the subset. Preferably, the first ASD's response time is less the second ASD's response time.

An exemplary ASD can be a disk drive or a cache memory subsystem.

Alternately, the invention can be regarded as a method for processing a data transfer request by a plurality of ASD's each having a variable response time and being connected to a requestor in a network, wherein the ASD's are configured to access a data set which is replicated in each ASD. The method includes multicasting the data transfer request from the requestor to the ASD's where the data transfer request represents a request to transfer at least a subset of the replicated data set. The method further includes receiving the data transfer request by the ASD's and communicating between the ASD's to designate one of the ASD's for processing of the data transfer request based on its variable response time. As a consequence, the ASD's which are not designated abandon efforts to satisfy the data transfer request. The method further includes processing the data transfer request with the designated ASD, and then sending an acknowledgment to the requestor when the processing is completed.

Preferably the not-designated ASD's monitor write data requests and set an indication to invalidate existing stored data corresponding to the data to be written. Preferred methods include monitoring the data to be written by not-designated ASD's and copying the data as it is written to the designated ASD.

The step of communicating between the ASD's preferably includes calculating a length of time to complete processing the request and posting the length of time to other ASD's.

In a preferred embodiment, the data transfer request is communicated into a switched fabric network comprising ASD nodes.

DETAILED DESCRIPTION OF THE PREFERRED EMBODIMENTS

Figure 1:
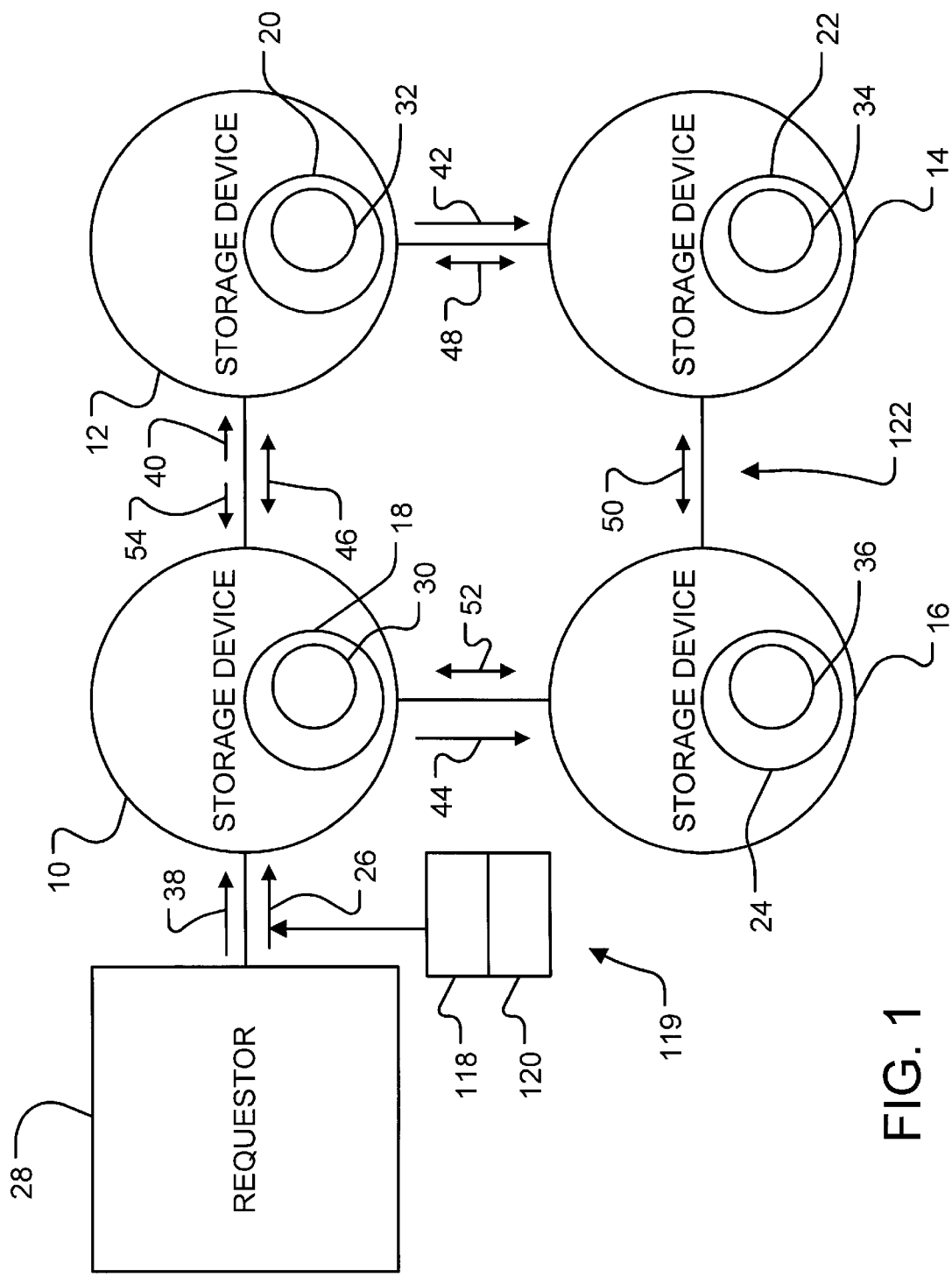
FIG. 1 is a diagrammatic representation of the method for operating a plurality of ASD's configured to access a replicated data set according to one embodiment of the present invention.
Figure 2:
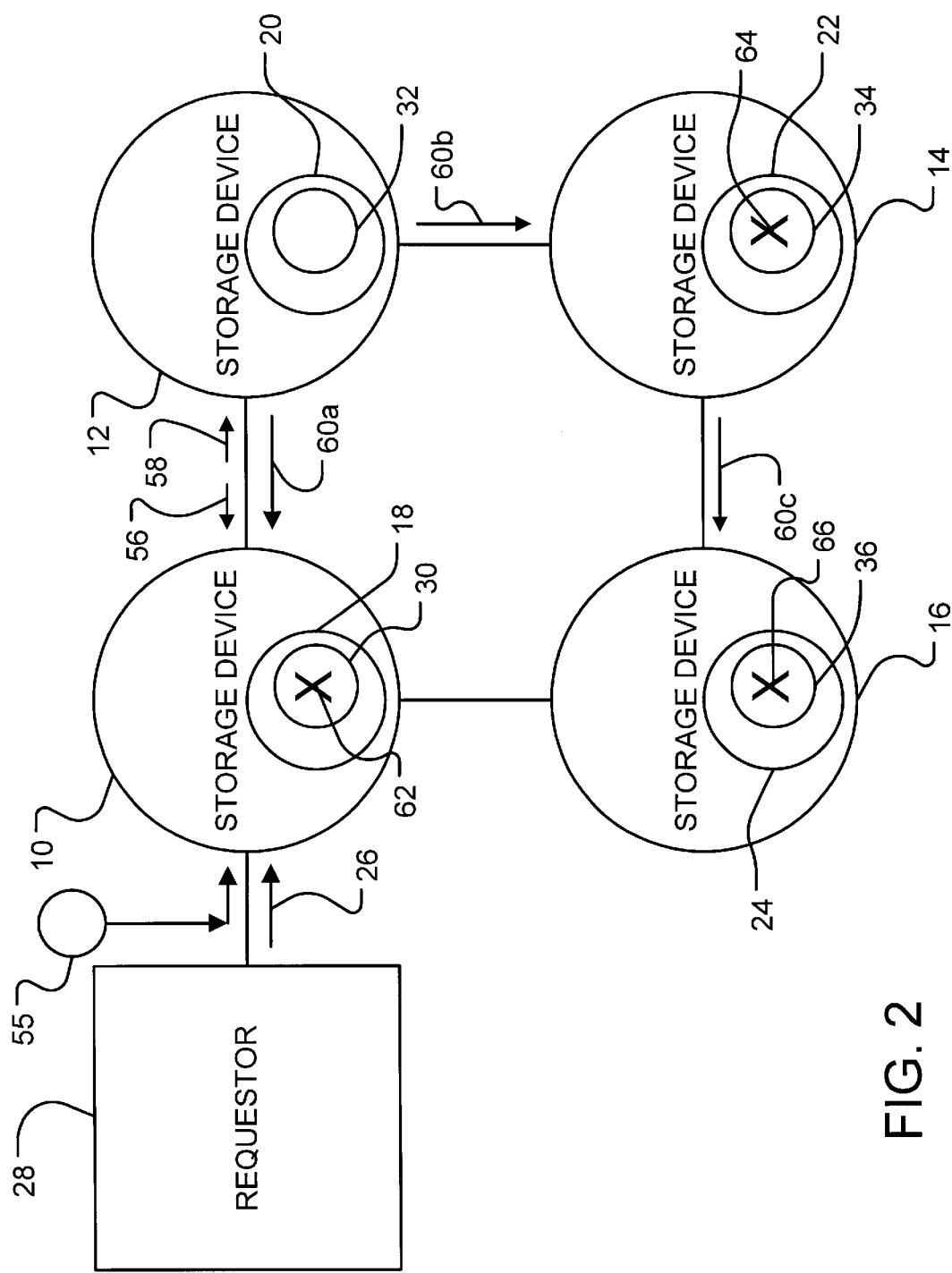
FIG. 2 is a diagrammatic representation of the invention of FIG. 1 showing a first method for designating a storage device for processing the data transfer request and for calling off the other storage devices.

With reference to FIGS. 1 and 2, a diagrammatic representation of a method for processing a data transfer request from a requestor connected to a plurality of ASD's (ASD's) 10, 12, 14, 16 configured to access a data set 18, 20, 22, 24 which is replicated in each ASD. A data transfer request 26 is multicasted from a requestor 28 to the ASD's 10, 12, 14, 16, the data transfer request 26 representing a request to transfer at least a subset 30, 32, 34, 36, 55 of the replicated data set. The data transfer request 26 is received 38, 40, 42, 44 by the ASD's 10, 12, 14, 16. The ASD's communicate 46, 48, 50, 52 between one another to designate one of the ASD's 12 for satisfying the data transfer request 26 while the other ASD's 10, 14, 16 abandon efforts to process the data transfer request 26. The designated ASD 12 processes the data transfer request 26 and communicates to the requestor 28 an acknowledgement 54 when the processing is completed.

With reference specifically to FIG. 2, the data transfer request 26 is a request to read the data 30, 32, 34, 36 from or write the data 55 to the ASD's 10, 12, 14, 16. The data 30, 32, 34, 36, 55 represents at least a subset of the replicated data set 18, 20, 22, 24. The ASD's 10, 12, 14, 16 can cooperate to select the first ASD 12 to begin reading the data 30, 32, 34, 36 or writing the data 55 as the designated ASD 12. The designated ASD 12 then prevents the other ASD's 10, 14, 16 from processing the data transfer request 26 by communicating to the other ASD's 10, 14, 16 a command 60a, 60b, 60c calling off the other ASD's 10, 14, 16.

Figure 5:
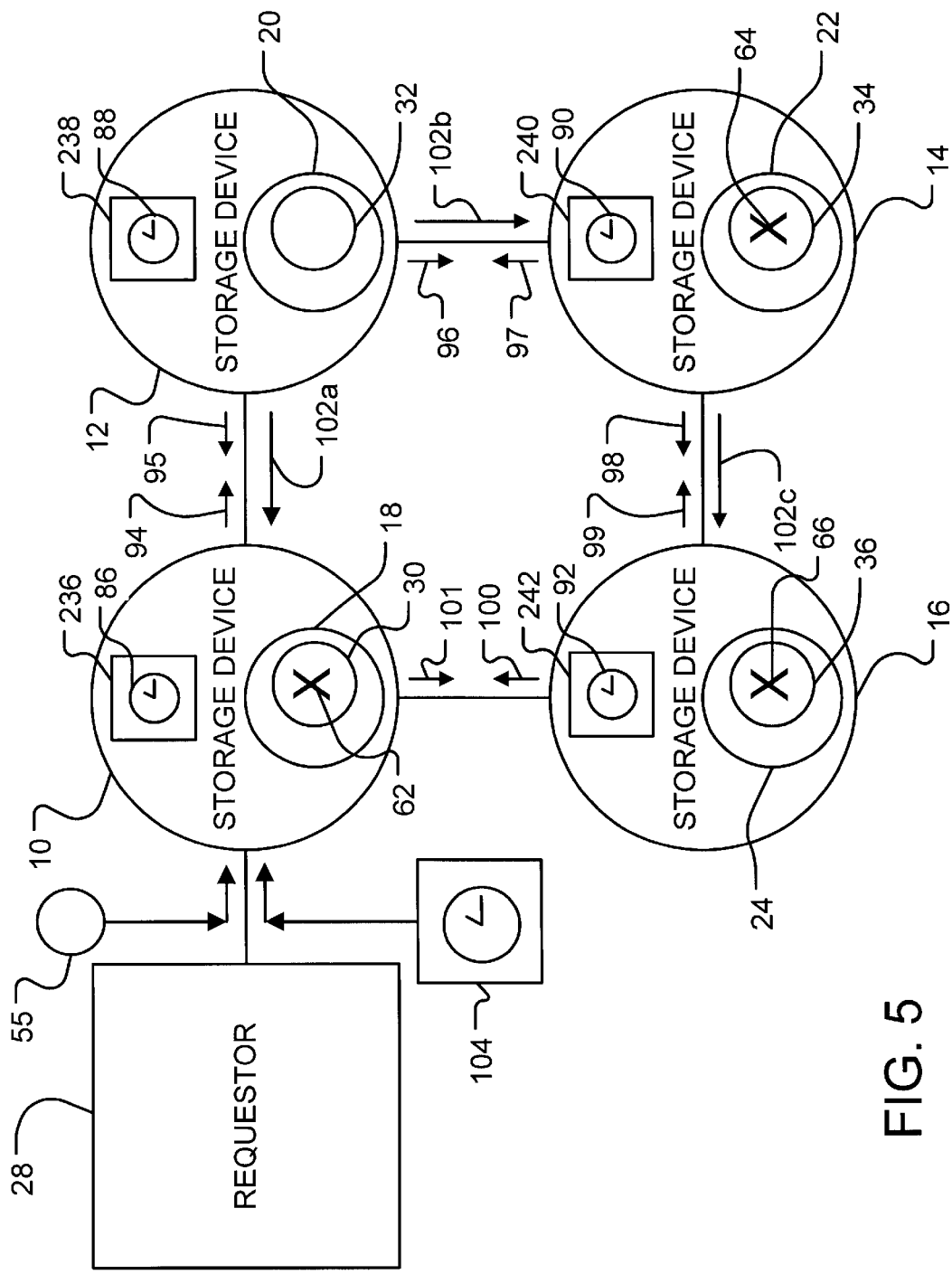
FIG. 5 is a diagrammatic representation of the invention of FIG. 1 wherein a storage device is designated by determining which storage device will require the shortest length of time to complete the processing of the data transfer request.

Rather than selecting the first ASD 12 to begin reading the data 30, 32, 34, 36 or writing the data 55 as the designated ASD 12 as described with reference to FIG. 2 above, the storage devices 10, 12, 14, 16 can cooperate to select the device that will be the first to complete the processing of the data transfer request 26 as the designated storage device 12. With reference to FIG. 5, the storage devices 10, 12, 14, 16 cooperate by first calculating a length of time 86, 88, 90, 92 required for each of the ASD's 10, 12, 14, 16 to complete the processing of the data transfer request 26. Each of the ASD's 10, 12, 14, 16 then communicates 94, 95, 96, 97, 98, 99, 100, 101 to each of the other ASD's 10, 12, 14, 16 the length of time required for each of the ASD's 10, 12, 14, 16 to complete the processing of the data transfer request 26. The ASD's 10, 12, 14, 16 then determine which of the ASD's 10, 12, 14, 16 requires the shortest length of time to complete the processing of the data transfer request 26. Finally, the ASD 12 which communicates that it requires the shortest length of time to complete the processing of the data transfer request 26 is selected as the designated ASD 12. The designated ASD 12 then communicates a command or control signal 102a, 102b, 102c to the other ASD's 10, 14, 16 to cause them to refrain from processing the data transfer request 26 to supply the subset. Designated ASD 12 then proceeds to supply the subset to requestor 28.

A system time reference 104 can be provided to each of the ASD's 10, 12, 14, 16 for use in determining if the calculated length of time 86, 88, 90, 92 is reliable. That is, by linking a time stamp of the system time reference, other ASD's or a host can determine an aging factor for the calculated length of time 86,88,90,92 and if the aging factor exceeds a threshold, the calculation may be termed invalid. In other aspects, the system time reference can serve to calibrate response time reports which do not arrive simultaneously.

In addition to using one of the methods described with reference to FIGS. 2 and 5 above to designate a storage device 12, the ASD's 10, 12, 14, 16 determine whether the data transfer request 26 is a request to write the data 55 to the ASD's 10, 12, 14, 16. If the there is a request 26 to write the data 55, indications 62, 64, 66 are set on each of the other ASD's 10, 14, 16 invalidating the existing data 30, 34, 36 corresponding to the data 55 to be written (see FIGS. 2 and 5). The data 55 is then transferred to and written to 58 the designated ASD 12.

Figure 3:
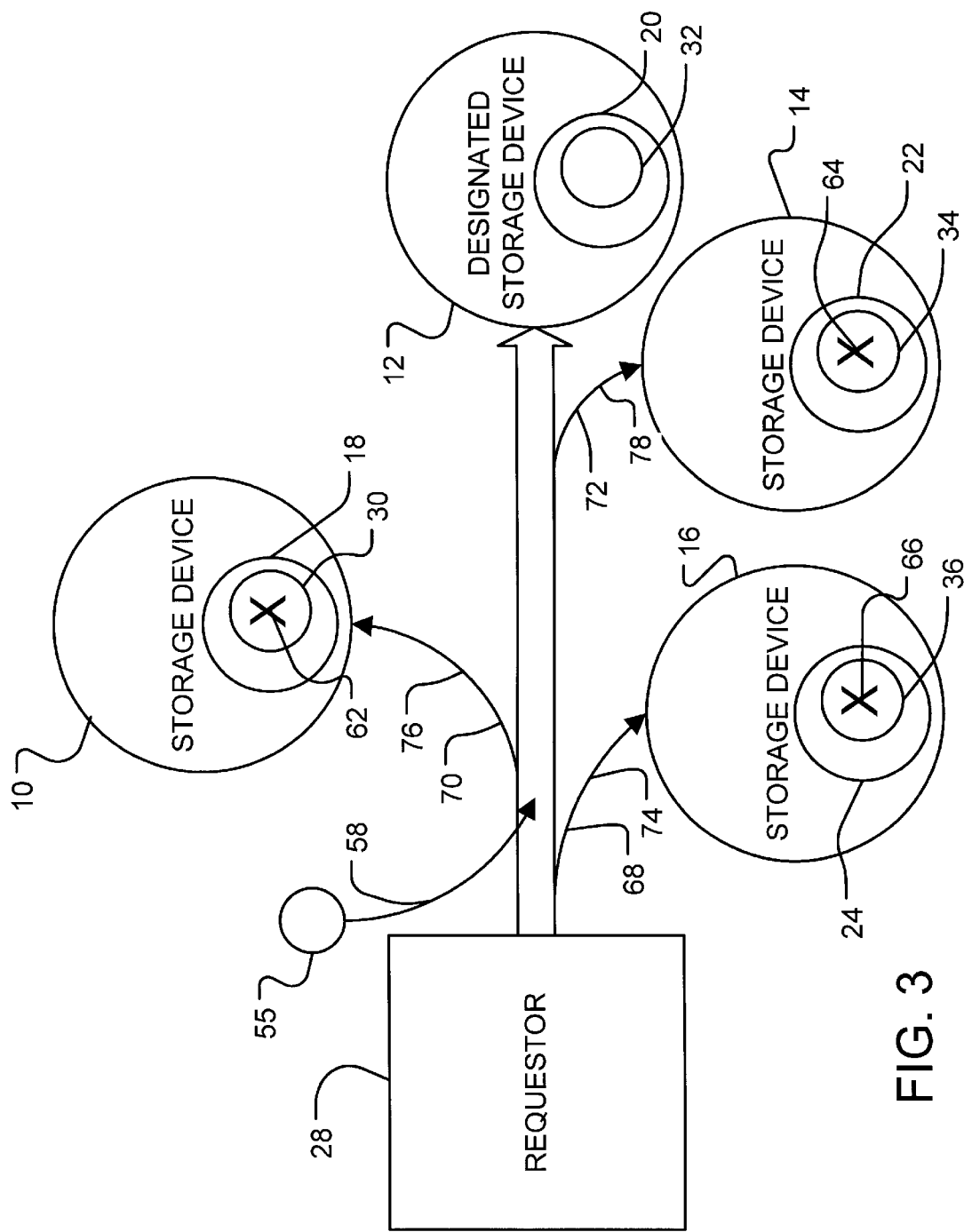
FIG. 3 is a diagrammatic representation of the invention of FIG. 1 illustrating the "snooping" method for replicating data among the storage devices.

With reference to FIG. 3, one method for copying 74, 76, 78 the data 55 to the other ASD's 10, 14, 16 and clearing the indications 62, 64, 66 invalidating the data 30, 34, 36 is illustrated. The other ASD's 10, 14, 16 monitor 68, 70, 72 and copy 74, 76, 78 the data 55 as it is transferred to the designated ASD 12. The indications 62, 64, 66 on each of the other ASD's 10, 14, 16 are cleared after completion of the copying 74, 76, 78 by each of the other ASD's 10, 14, 16.

Figure 4:
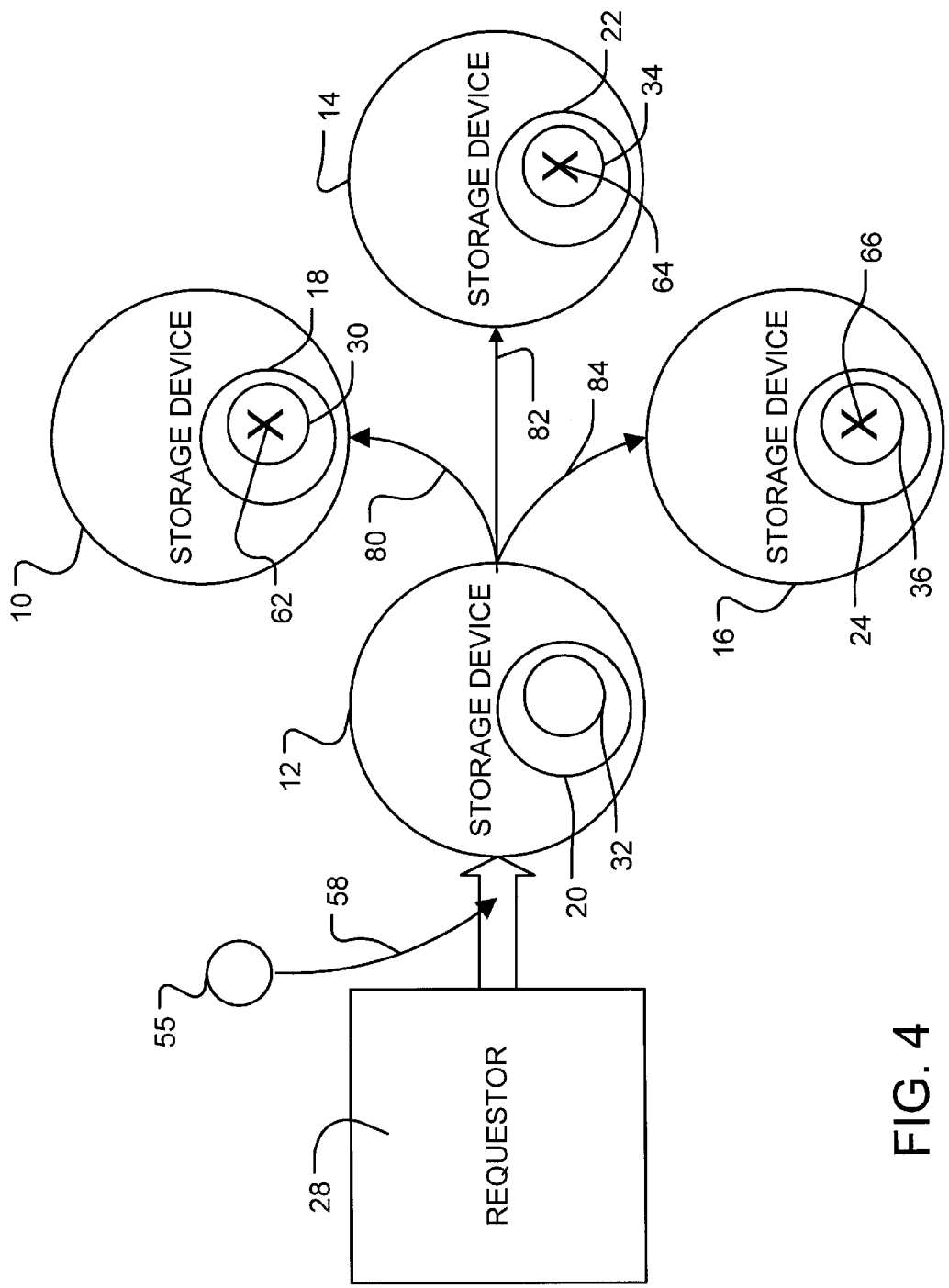
FIG. 4 is a diagrammatic representation of the invention of FIG. 1 illustrating the "secondary transmission" method for replicating data among the storage devices.

FIG. 4 illustrates another method for copying 80, 82, 84 the data 55 to the other ASD's 10, 14, 16 and clearing the indications 62, 64, 66 invalidating the data 30, 34, 36. After completing the writing of the data 55 to the designated ASD 12, the data 55 is transferred 80, 82, 84 from the designated ASD and then written to the other ASD's 10, 14, 16. The indications 62, 64, 66 on each of the other ASD's 10, 14, 16 are cleared after completion of the copying 74, 76, 78 by each of the other ASD's 10, 12, 14, 16.

Figure 6:
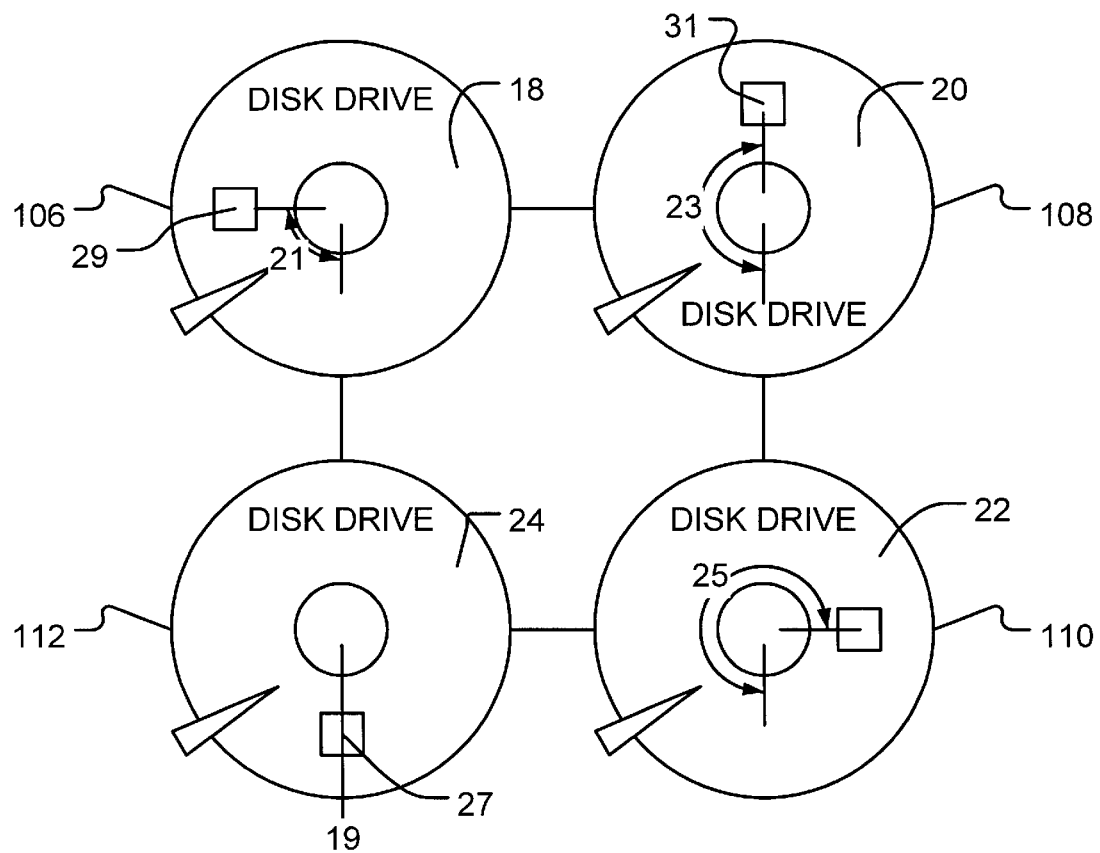
FIG. 6 is a diagrammatic representation of disk drives locked with a predetermined rotational offset relative to each other in the invention of FIG. 1.

With reference to FIG. 6, the ASD's 10, 12, 14, 16 can be disk drives 106, 108, 110, 112, each storing the replicated data set 18, 20, 22, 24. The disk drives can be locked with a predetermined rotational offset relative to each other to decrease rotational latency.

Again with reference to FIG. 1, a declaration 119 can be attached to the data transfer request 26. The declaration 119 includes a declaration of the destination address corresponding to some of the ASD's 118 and a declaration of an operation to be performed at the destination address 120. The data transfer request 26 is communicated into a switched fabric network 122 with switching nodes comprised of the ASD's 10, 12, 14, 16. The declaration 119 of the destination address is utilized to direct the data transfer request 26 to the ASD's 10, 12, 14, 16.

Figure 7:
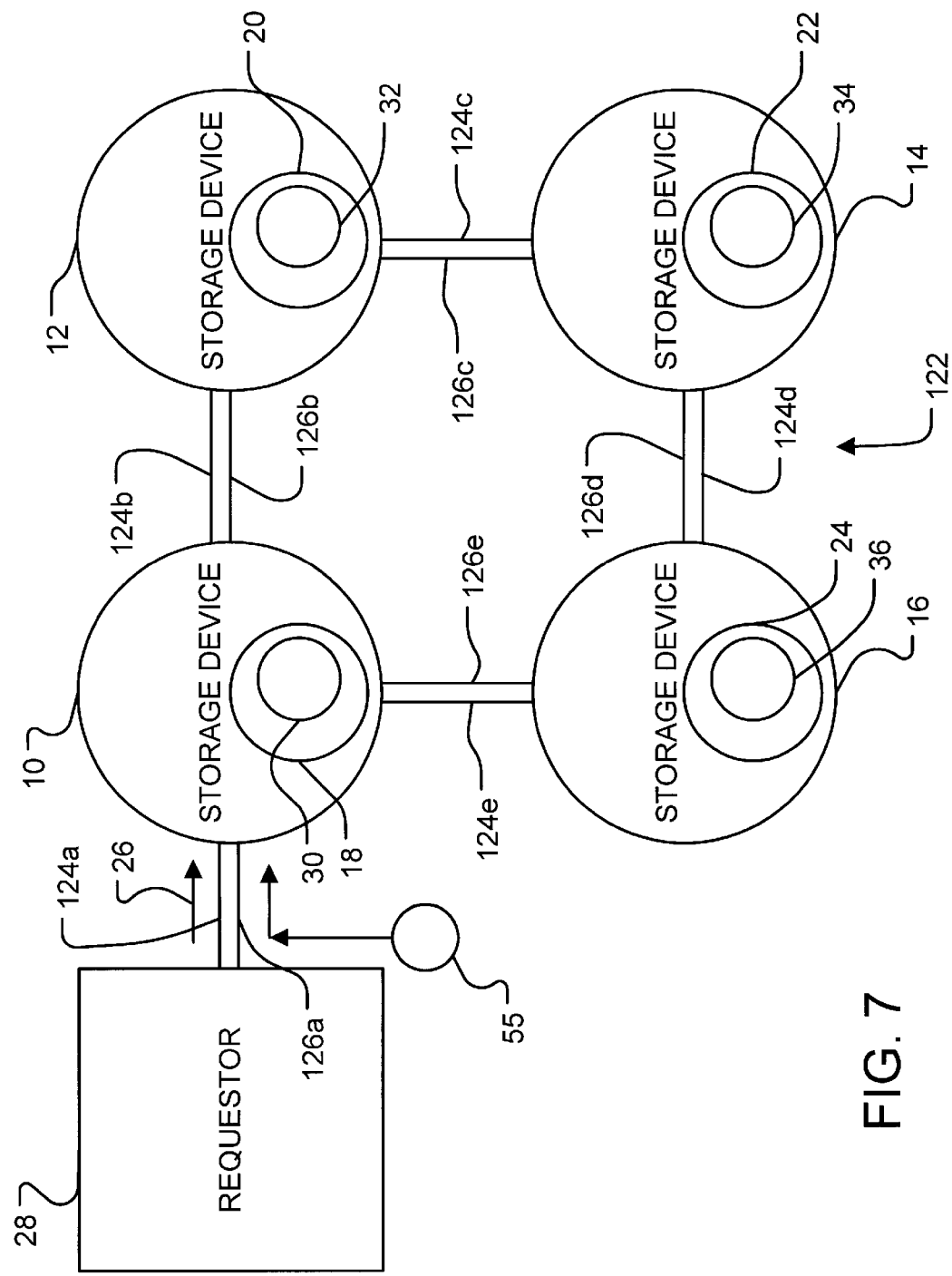
FIG. 7 is a diagrammatic representation of disk drives interconnected in the form of a switched fabric network with separate command and data layers in the invention of FIG. 1.

With reference to FIG. 7, the switched fabric network 122 can have separate command 124a, 124b, 124c, 124d, 124e and data 126a, 126b, 126c, 126d, 126e layers. The data transfer request 26 is communicated into the command layer 124a, 124b, 124c, 124d, 124e, and the subset of the replicated data set 30, 32, 34, 36, 55 is transferred into the data layer 126a, 126b, 126c, 126d, 126e so that commands and data can pass through the switched fabric network 122 substantially simultaneously.

Figure 8:
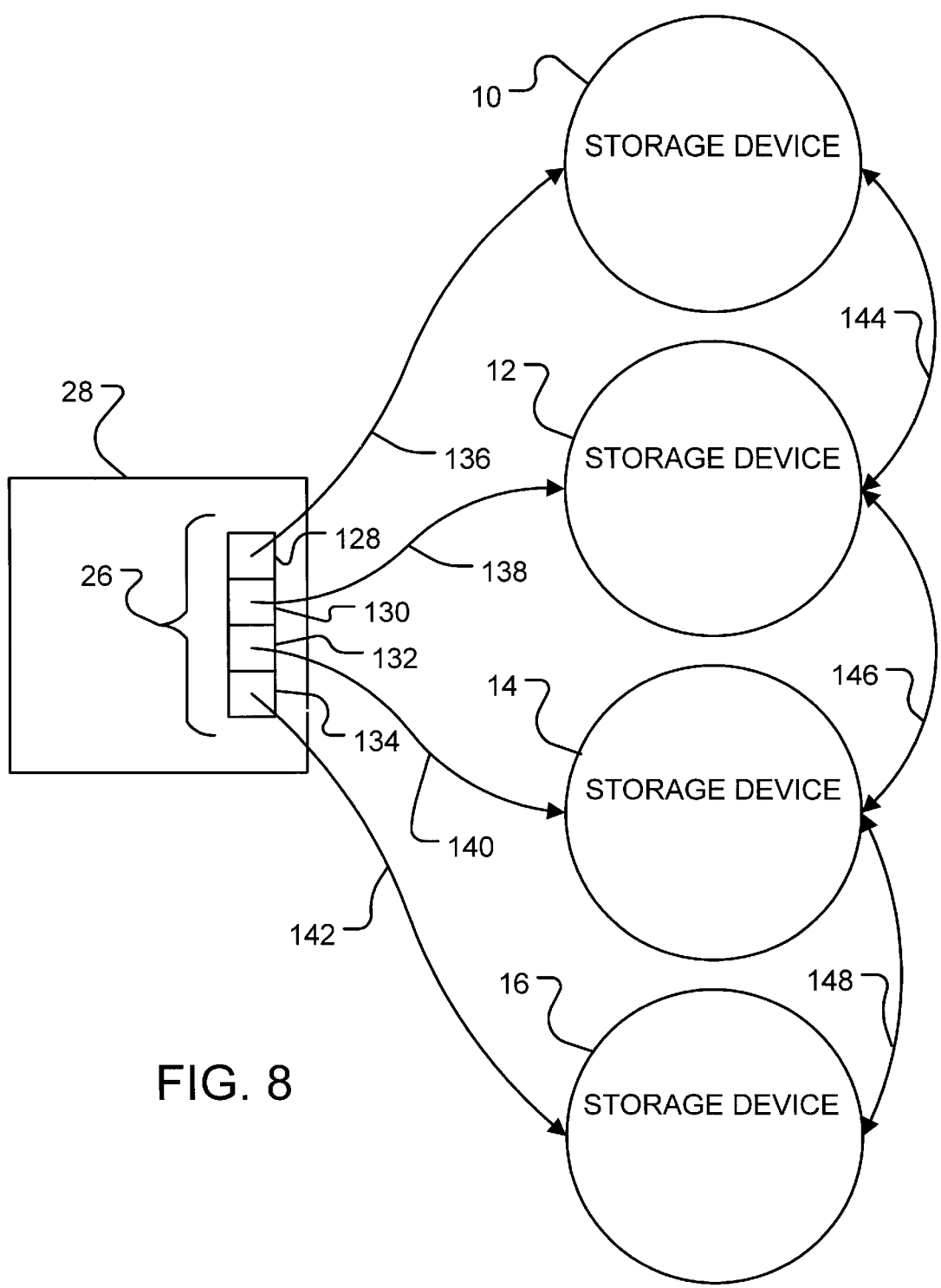
FIG. 8 is a diagrammatic representation of the substantially simultaneous processing of a divided data transfer request by multiple ASD's in the invention of FIG. 1.

With reference to FIG. 8, in order to increase the throughput of the processing, the data transfer request 26 can be divided into multiple data requests 128, 130, 132, 134. These multiple data requests are communicated 136, 138, 140, 142 from the requestor 28 to the ASD's 10, 12, 14, 16. The ASD's 10, 12, 14, 16 then cooperate 144, 146, 148 among each other to designate multiple ASD's 10, 12, 14, 16 to substantially simultaneously process the multiple data transfer requests 128, 130, 132, 134.

Figure 9:
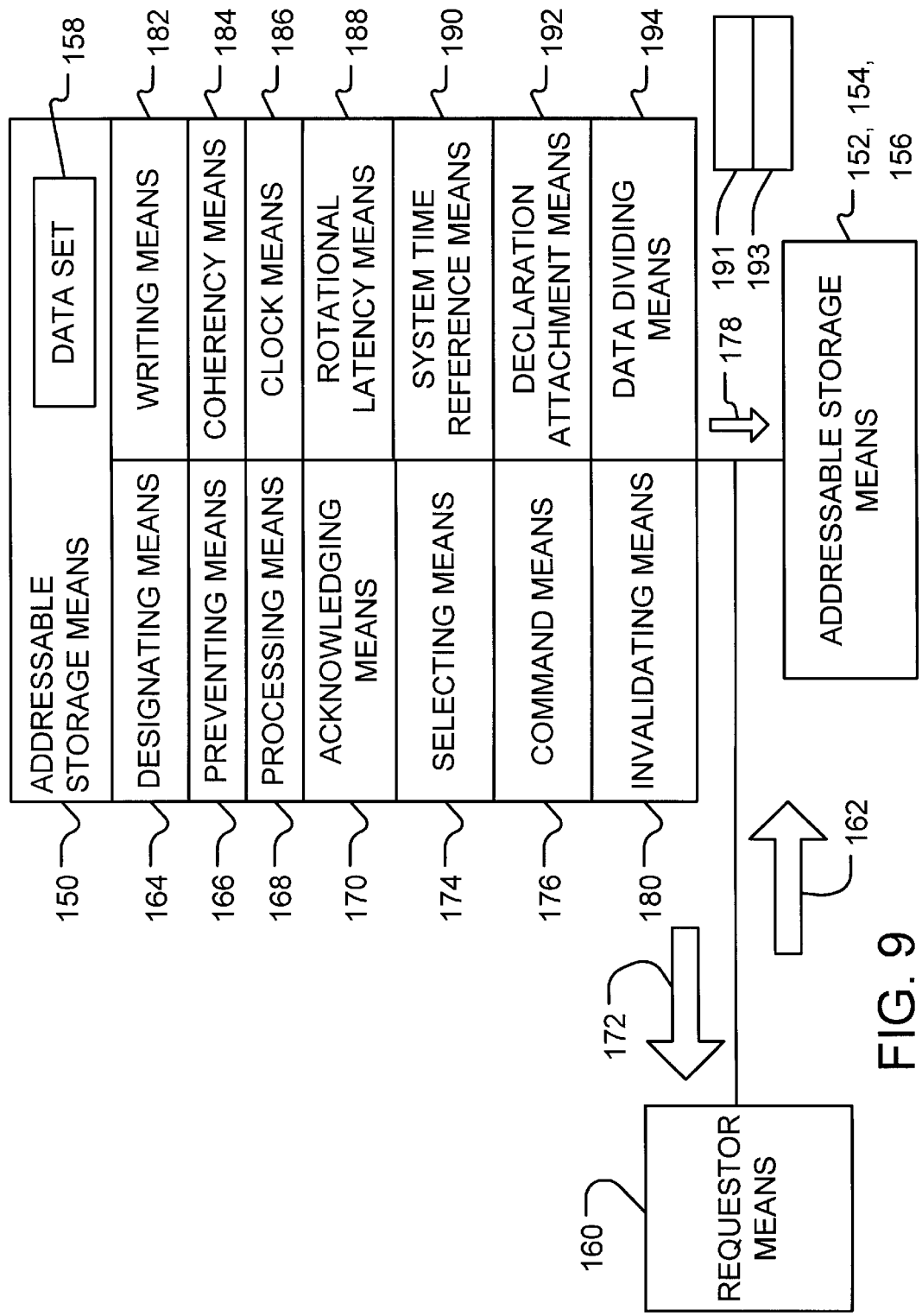
FIG. 9 is a diagrammatic representation of the system for operating a plurality of addressable storage means configured to access a replicated data set according to one embodiment of the invention.

With reference to FIG. 9, a system for accessing a replicated data set is shown. In the system, addressable storage means 150, 152, 154, 156 store a replicated data set 158 and a requester means 160 communicates a data transfer request 162 to the addressable storage means 150, 152, 154, 156. The data transfer request 162 represents a request to transfer at least a subset of the replicated data set. A designating means 164 designates one of the addressable storage means. The addressable storage means include a preventing means 166 which prevents the other storage means from processing the data transfer request. A processing means 168 processes the data transfer request; and an acknowledging means 170 communicates an acknowledgement 172 of the transfer of the subset of the replicated data set from the designated addressable storage means to the requestor means.

The data transfer request is a request to read data from or write data to the addressable storage means. The system includes a selecting means 174 which selects the first addressable storage means to begin reading the data or writing the data as the designated addressable storage means 150. A command means 176, upon reading the data from or writing the data to the designated addressable storage means, sends a command 178 from the designated addressable storage means to the other addressable storage means 152, 154, 156 to prevent them from processing the data transfer request.

Also, a clock means 186 can be included in addition to or as an alternative to the selecting means 174 and command means 176. The clock means 186 calculates a length of time required for each of the addressable storage means to complete the processing of the data transfer request and communicates, from each of the addressable storage means to each of the other addressable storage means, the length of time required for each of the addressable storage means to complete the processing of the data transfer request. The designating means 164 also selects the addressable storage means which communicates that it requires the shortest length of time to complete the processing of the data transfer request as the designated addressable storage means. The command means 176 can then prevent the other addressable storage means from processing the data transfer request. A system time reference means 190 can be used to provide a system time reference 104 to each of the ASD's for use in determining if the calculated length of time 86, 88, 90, 92 is reliable.

In another embodiment, requestor 28 can specify a target time for processing the data request to be processed. Each ASD can then effectively "bid" on processing the request by posting a projected time, based on a system time reference, for completion. The ASD which most closely approximates the target time can then be designated to process the request.

An invalidating means 180 sets the indication on each of the other addressable storage means invalidating existing data corresponding to the data to be written when the data transfer request is a request to write the data to the addressable storage means. The processing means further includes a writing means 182 which writes the data to the addressable storage means.

A coherency means 184 monitors the data to be written as it is transferred to the designated addressable storage means, copies the data as the data is being transferred to the designated addressable storage means, and clears the indication on each of the other addressable storage means after completion of the copying by each of the other addressable storage means.

The coherency means 184 can alternatively transfer the data written to the designated addressable storage means from the designated addressable storage means to the other addressable storage means, write the data to the other addressable storage means, and clear the indication on each of the other addressable storage means after completion of the writing of the data to the other addressable storage means.

A rotational latency minimization means 188 can lock the disk drives with a predetermined rotational offset relative to each other to decrease rotational latency.

A declaration attachment means 192 attaches to the data transfer request a declaration of a destination address corresponding to some of the addressable storage means for directing the data transfer request to the addressable storage means.

Separate means 191, 193 can be provided for transferring commands and data so that commands and data can pass through the switched fabric network substantially simultaneously.

A data dividing means 194 divides the data transfer request into multiple data transfer requests for substantially simultaneous processing by the multiple addressable storage means.

Returning to FIG. 1 to describe the invention in greater detail, the replicated data set 18, 20, 22, 24 is stored on the plurality of ASD's 10, 12, 14, 16. The replicated data set 18, 20, 22, 24 is substantially identical on each of the ASD's 10, 12, 14, 16. Whenever the subset 32 of the replicated data set is updated on one of the ASD's 12, the corresponding data 30, 34, 36 on the other ASD's 10, 14, 16 is updated so that coherency is maintained between the replicated data set 18, 20, 22, 24 on each of the ASD's 10, 12, 14, 16. The ASD's are preferably rotational storage media, such as hard drives. The storage devices may be contained in separate, interconnected computers, or may be multiple storage devices in a single computer.

The ASD's can be directly connected, or attached in a star, cube, hypercube, or other n-dimensional architecture. For simplicity of illustration, the figures show a network of only the four storage devices 10, 12, 14 16, however, the present invention allows for the connection of a greater or smaller number of storage devices.

As shown in FIG. 1, the storage devices 10, 12, 14, 16 can serve as nodes of the switched fabric network 122, forming a database structure on the switched fabric 122. The switched fabric structure 122 is advantageous because of its non-blocking behavior; the storage device nodes 10, 12, 14, 16 are not prevented from sending and receiving due to a predetermined or fixed path. Because of the multicasting ability of switched fabric networks, additional storage devices not containing the replicated data set 18, 20, 22, 24 can be included in the network without interfering with the data transfer operations between the devices that do contain the replicated data set 18, 20, 22, 24.

As shown in FIG. 7, the switched fabric network 122 can have two separate layers, the command layer 124a, 124b, 124c, 124d, 124e and the data layer 126a, 126b, 126c, 126d, 126e. The command layer 124a, 124b, 124c, 124d, 124e and the data layer 126a, 126b, 126c, 126d, 126e provide separate paths for transferring commands and data. Providing separate layers allows for out-of-band signaling so that commands and data can pass through the switched fabric network 122 substantially simultaneously. Alternatively, commands and data can be transferred over the same layer.

Figure 10:
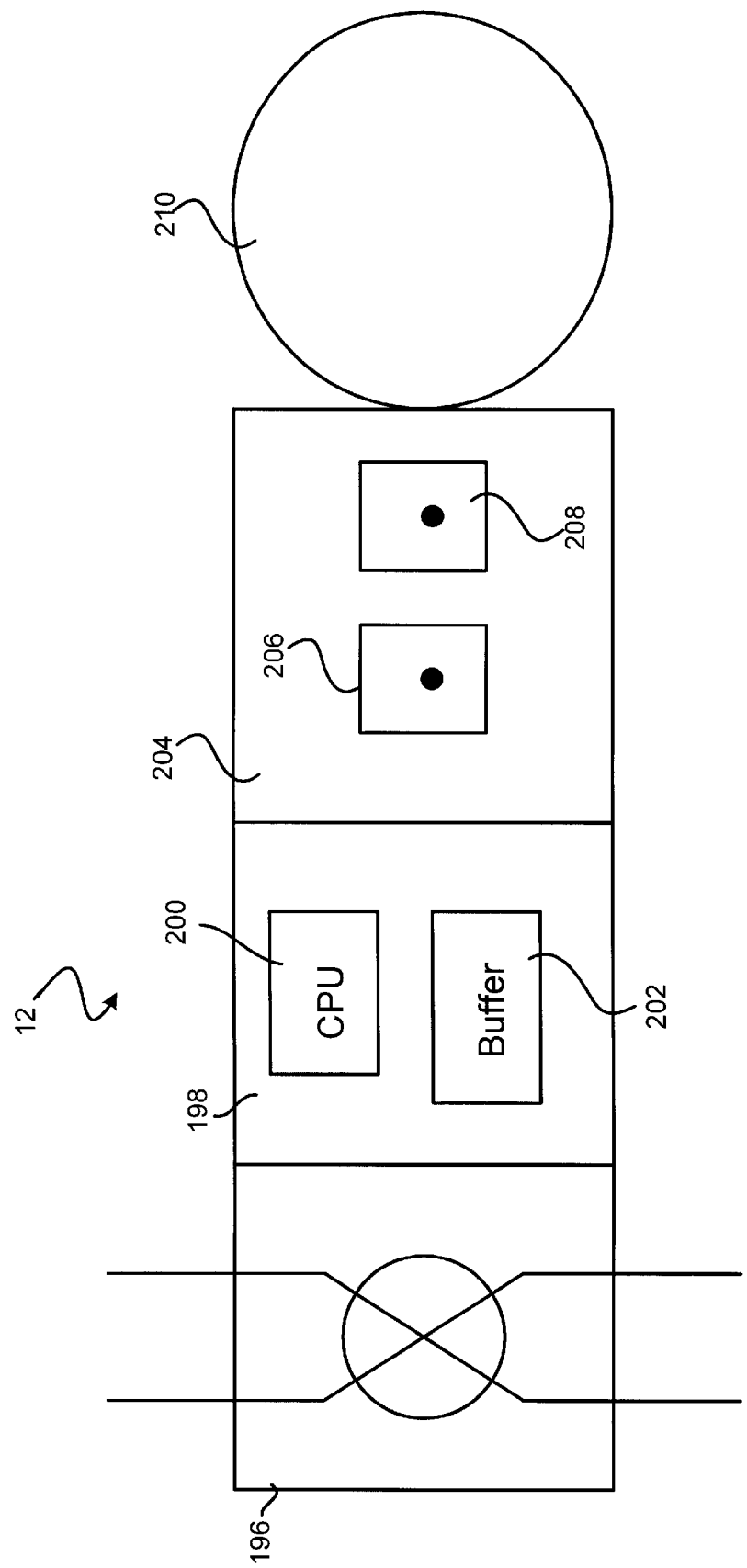
FIG. 10 is a diagrammatic representation of an integrated ASD for use in the invention of FIG. 1.

Each of storage devices integrates storage, intelligence and switching to allow it to serve as a node of the switched fabric network 122. FIG. 10 shows a more detailed diagrammatic representation of one of the storage devices 10, 12, 14, 16. The storage device 12 includes a switch element 196, a processing element 198 a storage element 204 and a storage medium 210. The processing element 200 includes a CPU (Central Processing Unit) 198 for providing the storage device 12 with intelligence, and a buffer 202 for temporary storage. The storage element 204 can include an interface ASIC (Application-Specific Integrated Circuit) 206 with isochronous streaming features and a recording channel ASIC 208 with privacy features. Generally the storage device 12 includes nonvolatile memory comprising a buffer for storing flags, a cache for storing a part of the data also stored on the storage medium and a queue for storing a series of commands awaiting execution. CPU 200 receives data transfer requests via switch element 196 and determines a response time based on latency of storage medium 210 and its queued commands. The response time is preferably multicast to peer ASD's in the switched fabric network and as discussed above, one of the interconnected ASD's is designated for satisfying the data transfer request.

Figure 11B:
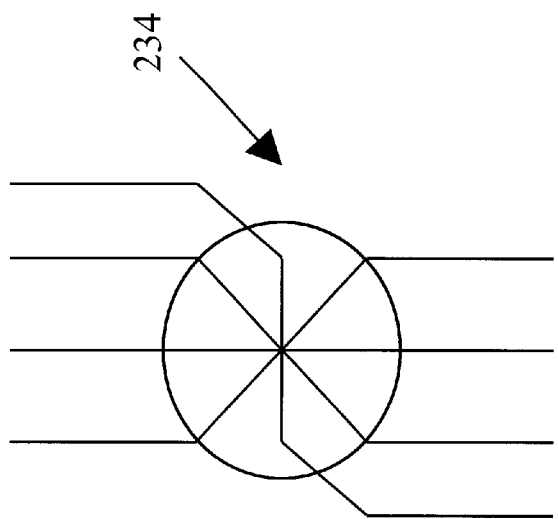
FIG. 11B shows a simplified diagrammatic representation of an eight-port switch for use in the invention of FIG. 1.
Figure 11A:
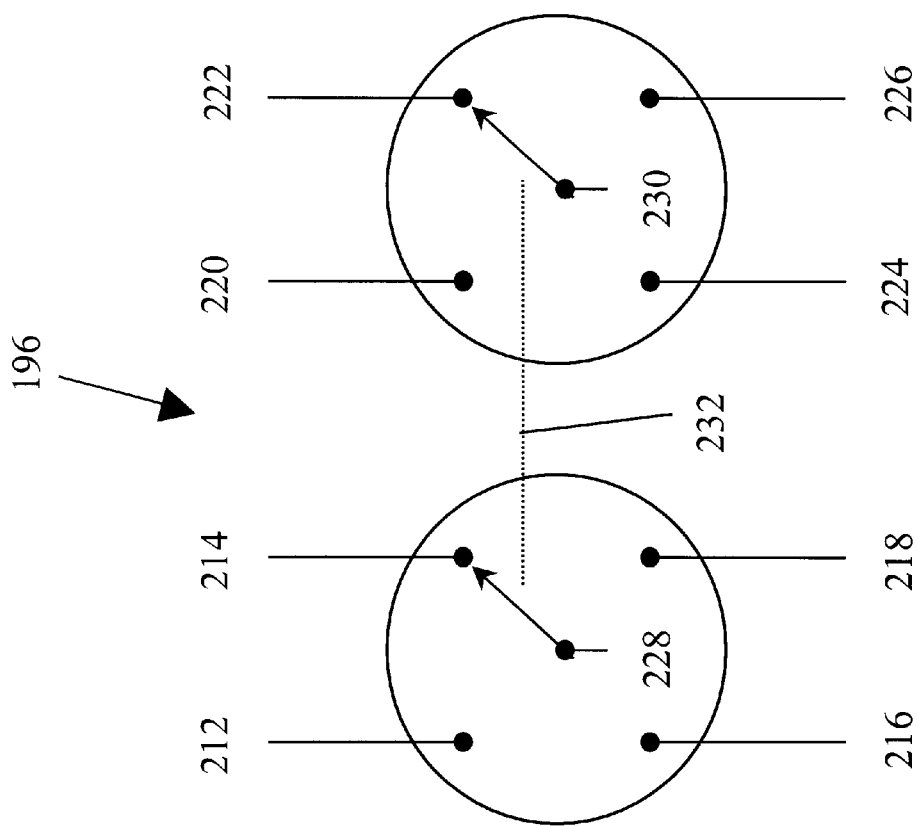
FIG. 11A shows a detailed diagrammatic representation of a four-port switch for use in the invention of FIG. 1.

The switch 196 in FIG. 10 is illustrated as a simplified 4-port switch. A more detailed diagrammatic illustration of the switch 196 is shown in FIG. 11A. The switch has four ports and two separate channels for commands and data. Command ports 212, 214, 216, 218 are shown as well as data ports 220, 222, 224, 226. The storage device 204 attaches to the center lines 228, 230 of the switch 196. The dashed line 232 indicates that the command and data portions of the switch operate in synchrony. Other switches can also be used. For example, FIG. 11B illustrates a simplified 8-port switch 234 which can be used in place of the 4-port switch 196 in FIG. 10. The separate command and data channels shown are represent a logical separation of command and data. The channels need not be transmitted on physically separate media. For example, frequency or time division multiplexing can be employed to allow both channels to co-exist on a single media.

The requestor 28 can be a server computer, a host or a user. The requestor 28 can include its own storage to store the data 55 to be written to the storage devices or to store the data 30, 32, 34, 36 to be read from the storage devices.

In the method of the present invention, the storage devices 10, 12, 14, 16 storing the replicated data 18, 20, 22, 24 first identify each other and note their respective addresses. Referring again to FIG. 1, the data transfer request 26 is communicated from the requestor 28 to the ASD's 10, 12, 14, 16. The data transfer request 26 can be broadcast to all the connected storage devices, or can be multicast to just those storage devices 18, 20, 22, 24 storing the replicated data set 18, 20, 22, 24. As shown in FIG. 2, the data transfer request 26 can be a request to write the updated data 55 to the ASD's 10, 12, 14, 16, or it may be a request to read the data 30, 32, 34, 36, 55 from the ASD's 10, 12, 14, 16. The data transfer request 26 is received 38, 40, 42, 44 by the storage devices 10, 12, 14, 16 and enters the queues of each of the storage devices 10, 12, 14, 16.

A multicast data transfer request 26 is sent as packets across the switched fabric network 122. Each packet is 64 bytes and requests an operation to be performed over a count of bytes from a source address and deposited into a destination address. The data itself is not part of the structure because in one embodiment the data and commands can take separate paths (i.e. out-of-band signaling). At the time the data transfer request 26 is executed, the designated storage device 12 can use the separate data path 126a, 126b, 126c, 126d, 126e to move the data (FIG. 7). Included in the packets making up the data transfer request 26 are packet headers 119 illustrated in FIG. 1. The packet headers include fields or declarations 119 specifying the source address, the destination address 118, the operation to be performed 120 and the attributes associated with the command. Table I shows a representative packet header data structure.

TABLE I

Packet Header Data Structure def addr_type = 128 bits
def count_type = 128 bits
def opcode_type = 64 bits
def attrib_type = 64 bits
STRUCT packet_header {
addr_type dest_addr, src_addr; [*] Destination and source addresses *
count_type count; [*] Count of data bytes associated with operation *
opcode_type opcode; [*] Operation to be performed *
attrib_type = attrib; [*] Flags, hints, attributes associated with
this command *[ ]{
    Qos; [*] Quality of Service *
    A_V; [*] Audio-Video Data stream *
    Prefetch; [*] Fetch next sequential block *
    Interrupt; [*] Interrupt upon completion *
    Early_complete; [*] Post done when data hits buffer *
    Reserved; [*] Plenty more to come *
    }

The method of the present invention includes minimizing the response time of the storage devices 10, 12, 14, 16 to the request to transfer data 26. The method also assures that the storage devices cooperate efficiently together to execute the request 26. To achieve these goals, the storage devices 10, 12, 14, 16 cooperate using their built-in intelligence (processing element 198 in FIG. 10) to designate one of the ASD's 12 for fulfilling the request 26. The storage devices 10, 12, 14, 16 cooperate by selecting one of the storage devices 12 and "calling-off" the other storage devices 10, 14, 16 to prevent them from fulfilling the request.

The storage devices 10, 12, 14, 16 can select the first ASD 12 to receive the request 26 through its queue and begin reading the data 30, 32, 34, 36 or writing the data 55 as the designated ASD 12. This is referred to as the "first through the queue" method. The storage device 12 can be considered to have begun reading or writing the data upon reading the first byte of data from, or writing the first byte of data onto its storage medium. When using disk drives as the storage devices, the storage medium is the disk surface. The selected ASD 12 then identifies itself by issuing a broadcast response or command 60a, 60b, 60c to the other devices 10, 14, 16. The selected storage devise thus "calls-off" the other ASD's 10, 14, 16 to prevent them from processing the data transfer request 26. This is analogous to a baseball center fielder calling off the left and right fielders to catch a deep fly ball. The broadcast response is also received by the requestor 28 to notify the requestor that the requested data has begun to be transferred. The other storage devices 10, 14, 16 then remove the request 26 from their queues, freeing their resources to handle other requests, and leaving the selected storage device 12 as the designated storage device for fulfilling the request 26.

Rather than selecting the first ASD 12 to begin reading the data 30, 32, 34, 36 or writing the data 55 as the designated ASD 12, the storage devices 10, 12, 14, 16 can cooperate to select the device that will be can complete the processing of the data transfer request 26 first as the designated storage device 12. This is referred to as the "compute access time" method. With reference to FIG. 5, each storage device 10, 12, 14, 16 utilizes a clock 236, 238, 240, 242 to calculate its access time 86, 88, 90, 92 required for completing the request 26. Each storage device can include its seek, rotational and transfer times in calculating its access time. In addition, if other commands are already queued, then the time required to satisfy the commands already in the queue is summed and added to the total time. U.S. Pat. No. 4,851,998 to Hospodor, describes a method which each of the storage devices can use to determine its access time and is incorporated by reference in its entirety into the present disclosure.

Each of the ASD's 10, 12, 14, 16 then communicates, broadcasts or multicasts 94, 95, 96, 97, 98, 99, 100, 101, to each of the other ASD's 10, 12, 14, 16, the length of time required for each of the ASD's 10, 12, 14, 16 to complete the processing of the data transfer request 26. The ASD's 10, 12, 14, 16 then determine which of the ASD's 10, 12, 14, 16 requires the shortest length of time to complete the processing of the data transfer request 26. Finally, the ASD 12 which communicates that it will be the first in time to complete the processing of the data transfer request 26 is selected by the ASD's as the designated ASD 12. The designated ASD 12 multicasts a command 102a, 102b, 102c to the other ASD's 10, 14, 16 to "call off" the other storage devices and prevent them from processing the data transfer request 26. Once again, this is analogous to a baseball center fielder calling off the left and right fielders to catch a deep fly ball. The other storage devices 10, 14, 16 then remove the request 26 from their queues, freeing their resources to handle other requests, and leaving the selected storage device 12 as the designated storage device for fulfilling the request 26. The "compute access time" method has several advantages over the "first through the queue" method. The "compute access time" method assures early invalidation— the data is marked invalid and removed from the storage device queues early in the process, allowing for better scheduling of requests on the storage devices. The disadvantage of the "compute access time" method is that it requires an additional multicast operation.

A system time reference 104 can be provided to each of the ASD's 10, 12, 14, 16. The system time reference provides an absolute time used in determining when each storage device calculated its access time. This absolute time reference can be used in determining if an access time was calculated too far in the past to be reliable.

In addition to using one of the methods described with reference to FIGS. 2 and 5 above to designate a storage device 12 for fulfilling the data transfer request 26, the ASD's 10, 12, 14, 16 determine whether the data transfer request 26 is a request to write the data 55 to the ASD's 10, 12, 14, 16. When the data 55 is written to one of the ASD's, the subset of the replicated data 30, 32, 34, 36 is no longer coherent, or substantially identical, between the designated storage device 12 and the other storage devices 10, 14, 16.

In order to assure that coherency is maintained between the data set replicated on each of the storage devices, the indications or invalidation flags 62, 64, 66 are set on each of the other ASD's 10, 14, 16 invalidating the existing data 30, 34, 36 corresponding to the data 55 to be written (see FIGS. 2 and 5). The successive read requests 26 for the invalidated data 30, 34, 36 do not result in a response from the other storage devices 10, 14, 16 until the data 30, 34, 36 is updated with the new data 55 and 32, and the invalidation flags are cleared.

The storage devices 10, 14, 16 maintain the invalidation flags 62, 64, 66 in the nonvolatile memory for coherent recovery after a power failure or abnormal end occurs. Any power failure that occurs after the data 30, 34, 36 is invalidated results in the data being flushed from the storage device, and replaced with the updated data 32 from the designated storage device 12. Alternatively, atomic operations can be used to assure coherent recovery after a power failure. An atomic operation is one that will either complete or return to its original state if a power interruption or an abnormal end occurs. Thus, when a power failure occurs or abnormal end occurs, the data 30, 34, 36 returns to its initial state and the requestor 28 is notified that the operation did not complete.

The nonvolatile memory used for storing the invalidation flags may include rotating disk storage, flash or EEPROM, battery protected RAM, ferroelectric DRAM and other memory technologies that will retain the invalidation flags when there is a power failure. Rotating storage is generally one of the slowest, but least expensive, nonvolatile memories available.

FIG. 3 illustrates the "snooping" method for copying 74, 76, 78 the data 55 to the other ASD's 10, 14, 16 and clearing the invalidation flags 62, 64, 66. The other ASD's 10, 14, 16 monitor 68, 70, 72 and copy 74, 76, 78 the data 55 as it is multicast to the designated ASD 12. The other storage devices 10, 14, 16 can operate in a "promiscuous" mode in which they examine all passing data packets in their multicast group. The flags 62, 64, 66 on each of the other ASD's 10, 14, 16 are cleared from memory after coherency is restored among the data 30, 32, 34, 36 stored by the ASD's 10, 12, 14, 16.

FIG. 4 illustrates the "secondary transmission" method for copying 80, 82, 84 the data 55 to the other ASD's 10, 14, 16 and clearing the indications 62, 64, 66 invalidating the data 30, 34, 36. After completing the writing of the data 55 to the designated ASD 12, the data 55 is broadcast or multicast 80, 82, 84 from the designated ASD and then written to the other ASD's 10, 14, 16. The flags 62, 64, 66 on each of the other ASD's 10, 14, 16 are cleared from memory after coherency is restored among the data 30, 32, 34, 36 stored by the ASD's 10, 12, 14, 16.

With reference to FIG. 6, the plurality of disk drives 106, 108, 110, 112, each storing the replicated data set 18, 20, 22, 24 can be used advantageously to decrease disk access time by locking the disk drives with a predetermined rotational offset relative to each other to decrease rotational latency. In the general case, a set of N storage devices would have staggered rotational offsets of 360/n degrees, resulting in a decreased average rotational latency. FIG. 6 shows four disk drives locked with a predetermined rotational offset. The disk drives are locked so that data sectors 19, 21, 23, 25 are at angles 19, 21, 23, 25 of 0°, 90°, 180°, and 270° respectively, thus having rotational offsets of 90° from each other.

With reference to FIG. 8, in order to increase the throughput of the processing, the data transfer request 26 can be divided into multiple data requests 128, 130, 132, 134. This is particularly useful for large transfers of data contained on more than a single track of the disk drive. These multiple data requests are communicated 136, 138, 140, 142 from the requestor 28 to the ASD's 10, 12, 14, 16. The ASD's 10, 12, 14, 16 then cooperate 144, 146, 148 among each other to designate multiple ASD's 10, 12, 14, 16 to substantially simultaneously process the multiple data transfer requests 128, 130, 132, 134. A replication set of N storage devices can improve the throughput of a large transfer by a factor of N.

I claim:

1. A method for operating a plurality of addressable storage devices (ASD's) that store a replicated data set, the method comprising the steps of:
   receiving a multicasted request for the ASD's to supply a subset of the replicated data set, the subset being stored in both a first one and a second one of the ASD's;
   multicasting a control signal from the first ASD so that the second ASD receives the control signal and refrains from supplying the subset; and
   supplying the subset from the first ASD.

2. The method of claim 1 wherein the first ASD has a first response time for supplying the subset, the second ASD has a second response time for supplying the subset and the first response time is less than the second response time.

3. The method of claim 1 wherein the first ASD has a first response time for supplying the subset, the second ASD has a second response time for supplying the subset, the first response time is substantially equal to the second response time and the first ASD provides its response time before the second ASD provides its response time.

4. The method of claim 3 wherein the first ASD is selected to supply the subset.

5. The method of claim 2 wherein the first ASD is a disk drive.

6. The method of claim 3 wherein the disk drive has a cache memory.

7. The method of claim 2 wherein the first ASD comprises a cache memory.

8. The method of claim 2 wherein the second ASD comprises a cache memory.

9. A method for processing a data transfer request by a plurality of ASD's (ASD's) connected to a requestor in a network, each ASD having a response time for satisfying the data transfer request which is variable among the ASD's, wherein the ASD's are configured to access a data set which is replicated in each ASD, the method comprising the steps of:
   multicasting the data transfer request from the requestor to the plurality of ASD's, the data transfer request for transferring at least a subset of the replicated data set;
   receiving the multicast data transfer request by the ASD's at substantially the same time;
   communicating between the ASD's to designate one of the ASD's to satisfy the request based on its variable response time;
   abandoning an effort to satisfy the request by those ASD's which are not designated;
   processing the data transfer request with the designated ASD; and
   sending an acknowledgment from the designated ASD to the requestor when the processing is completed.

10. The method of claim 9, wherein the abandoning step further includes the step of:
    determining whether the data transfer request is a request to write data to the ASD's, and if so, setting an indication on each of the not-designated ASD's for invalidating existing stored data corresponding to the data to be written.

11. The method of claim 10, further comprising the steps of:
    monitoring, by the not-designated ASD's the data to be written as it is transferred to the designated ASD;
    copying of the data by the not-designated ASD's as the data is being transferred to the designated ASD; and
    clearing the indication on each of the not-designated ASD's after completion of the copying.

12. The method of claim 10, further comprising the steps of:
    completing the writing of the data to the designated ASD;
    transferring the data written to the designated ASD from the designated ASD to the not-designated ASD's and writing the data in the not-designated ASD's; and
    clearing the indication on each of the not-designated ASD's after completion of the writing the data to the not-designated ASD's.

13. The method of claim 9, wherein the communicating step further includes the steps of:
    calculating a length of time required for each of the plurality of ASD's to complete the processing of the data transfer request;
    posting, among the plurality of ASD's, the length of time;
    determining from the length of time which of the plurality of ASD's can complete the processing of the data transfer request in the least amount of time; and
    selecting a designated ASD which can complete the processing of the data transfer request in the least amount of time.

14. The method of claim 13, wherein the determining step further includes the step of:
    providing a system time reference to each of the ASD's for use in determining if the calculated length of time is reliable.

15. The method of claim 9 wherein the variable response time is based on a time specified by the requester.

16. The method of claim 9, wherein the ASD's comprise disk drives and further comprising the step of:
    locking the disk drives with a predetermined rotational offset relative to each other to decrease rotational latency.

17. The method of claim 9, wherein the step of multicasting a data transfer request includes the steps of:
    attaching to the data transfer request a declaration of a destination address corresponding to some of the ASD's and a declaration of an operation to be performed at the destination address;
    transmitting the data transfer request into a switched fabric network with switching nodes comprised of the ASD's; and
    utilizing the declaration of the destination address to direct the data transfer request to the ASD's.

18. The method of claim 17, wherein:

the data transfer request is transmitted into a command layer of the switched fabric network; and the subset of the replicated data set is transferred into a data layer separate from the command layer so that commands and data can pass through the switched fabric network substantially simultaneously.

19. The method of claim 9, further comprising the steps of:

dividing the data transfer request into multiple data transfer requests;

communicating the multiple data transfer requests from the requestor to the ASD's; and cooperating among the ASD's to designate multiple ASD's to substantially simultaneously process the multiple data transfer requests.

* * * * *